Sept. 2, 1952 — H. F. BLAIR — 2,609,419
IMPEDANCE TESTING APPARATUS
Filed May 20, 1948
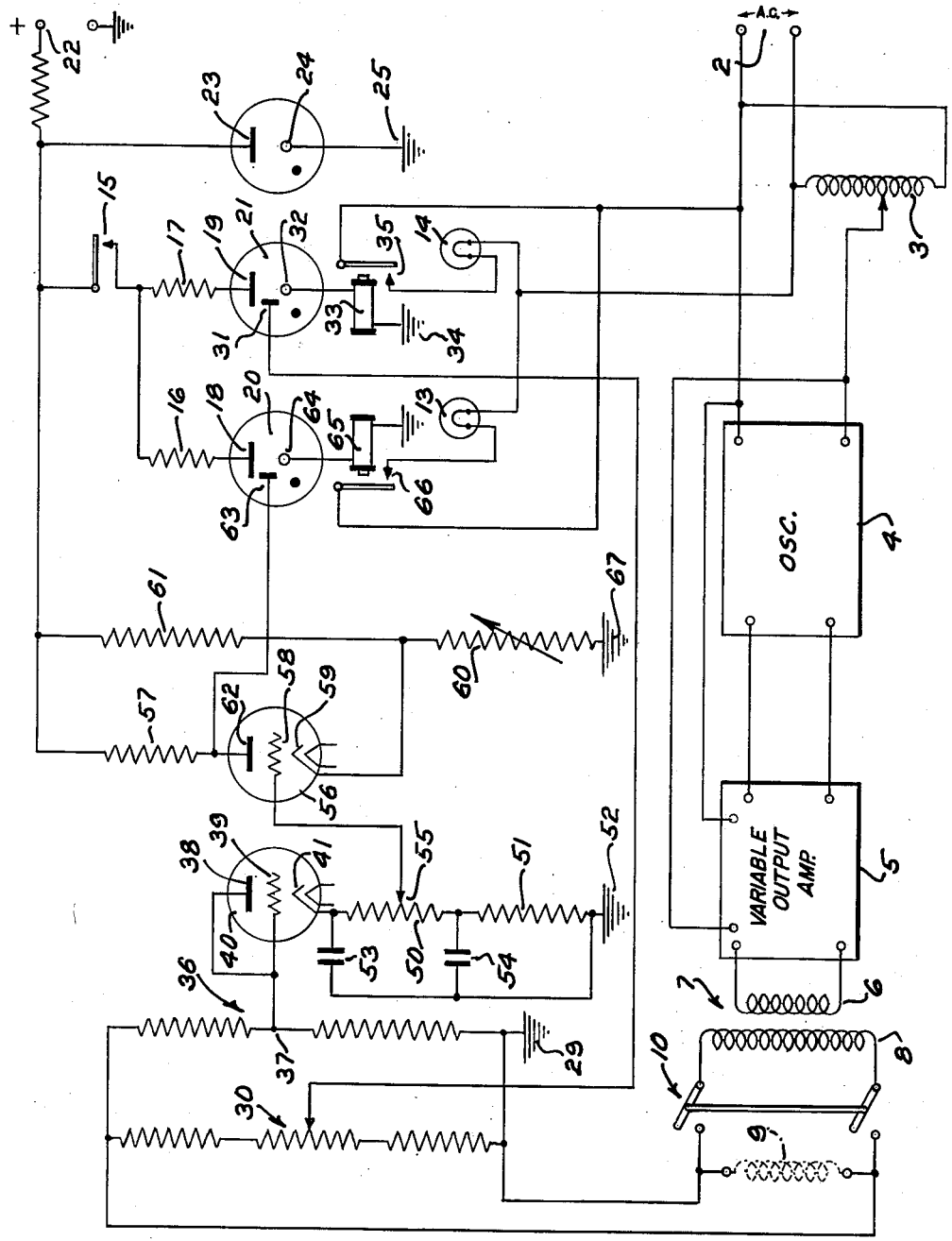
INVENTOR
H. F. BLAIR
BY E. A. Kane
ATTORNEY Patented Sept. 2, 1952

2,609,419

UNITED STATES PATENT OFFICE 2,609,419

IMPEDANCE TESTING APPARATUS

Harold F. Blair, Naperville, Ill., assignor to Western Electric Company, Incorporated, New York, N. Y., a corporation of New York Application May 20, 1948, Serial No. 28,230

7 Claims. (Cl. 175—183)

1

This invention relates to an impedance testing apparatus, and more particularly to an apparatus for applying a high frequency-high voltage current through the coil of a relay and indicating whether the impedance of the winding is within, above or below a predetermined range.

In the manufacture of relays the wires of the relay coil occasionally become broken or the insulation between adjacent wires is insufficient to the extent that while the wires may not be short circuited, there is a possibility of a breakdown in service.

It is an object of the present invention to provide an impedance measuring apparatus which will automatically indicate whether an article under test has more or less than the desired impedance.

In accordance with one embodiment of the invention as applied to relay coils, an oscillator connected through an amplifier and a transformer to the winding of the coil supplies A. C. at a selected frequency to the winding of a relay coil and a detector connected in parallel with the coil of the relay controls a pair of lamps, which upon being lighted indicate that the coil under test has an impedance above or below a predetermined range. The detector includes a voltage divider connected across the current supply to the coil and arranged to supply a positive voltage to the control anode of a cold cathode tube to trip the tube and cause it to supply current to a relay in its cathode circuit when the impedance of the coil exceeds the selected range, and consequently the voltage drop across the voltage divider is greater than when the coil has the proper impedance.

Also in the detector circuit is a second cold cathode tube, the control anode of which is connected to the plate of an amplifier tube, serving as an inverter, the grid of which is in turn supplied with biasing voltage from the cathode of a rectifier tube which serves to rectify the output of a second voltage divider connected across the current supply to the relay coil.

A complete understanding of the invention may be had by reference to the following detailed description when considered in conjunction with the accompanying drawing, wherein the single figure illustrates diagrammatically an impedance measuring and indicating circuit comprising one embodiment of the invention.

In the drawing, a 110 volt alternating current supply is indicated at 2, which supplies current through an autotransformer 3 to an oscillator 4 and an amplifier 5. As is well known in the art the output of most amplifiers in use today tends to vary slightly with changes in the amplifier load, and although this variation is not particularly pronounced nor is it desirable in most cases, use is made here of the amplifier output variation in a manner that will more fully appear hereinafter. The output of the amplifier 5 is connected to the primary 6 of a step-up transformer 7, the secondary 8 of which supplies test current across the winding of a relay coil 9 under test upon closure of a double pole single throw switch 10.

The autotransformer 3 may be set and the oscillator 4, amplifier 5 and transformer 7 may be arranged so that with a specific type of relay coil 9, a test current of 1400 volts at a frequency of 7000 cycles will be applied across the relay coil upon closing switch 10. When the high voltage current at high frequency is applied across the winding of the relay coil, the impedance of the coil will be detected by detector circuits connected in parallel with the coil and which serve to selectively light either lamp 13 or lamp 14, depending upon whether the winding of the coil 9 has less impedance than the selected range, or more impedance than a selected range, whereas if the coil falls within the selected range neither lamp 13 nor 14 will be lighted.

With the relay coil 9 connected across the output 8 of the transformer 7, closure of a switch 15 will connect the positive side of a current supply source 22 through resistors 16 and 17 to anodes 18 and 19, respectively, of a pair of cold cathode tubes 20 and 21. This current supply from source 22 may be regulated by a voltage regulator tube 23, the cathode 24 of which is connected to ground at 25. Upon being connected to the current source 22 either the tube 20 or 21 will fire if the impedance in the coil 9 is below or above the desired range. The firing of these tubes is controlled by the impedance value of the coil 9, since, if the coil 9 has an impedance above the selected range, the voltage drop across a voltage divider 30 grounded at 29 and connected in parallel with the coil will be greater than when the coil has the proper or less than the proper amount of impedance, and consequently a control anode 31 of the tube 21 will become sufficiently positive with respect to the cathode 32 of the tube to cause the tube to conduct and thus current will flow from the positive source 22 through the switch 15 now closed across the tube 21 to energize a relay 33, having one end of its windings connected to the cathode 32 and the other end connected to ground at 34. Energization of the relay 33 will complete a circuit from one side of the 110 volt source 2 to the filament of the lamp 14 through contacts 35 of the energized relay and back to the other side of the 110 volt line.

Closure of the switch 15 will, simultaneously with the application of positive voltage to the plate 19, also apply voltage to the plate 18 of the tube 20, and in the event that the impedance of the coil 9 is less than the selected range, the tube 20 will fire. A second voltage divider 36 also grounded at 29 is connected in parallel with the coil 9 and the center tap 37 of the voltage divider 36 is connected to a plate 38 and grid 39 of a rectifier tube 40 for furnishing a positive voltage of sufficient amplitude to fire tube 20 if the impedance of the coil under test is too low.

Cathode 41 of the tube 40 is connected through a potentiometer 50 and resistance 51 to ground at 52, the potentiometer 50 and resistance 51 being shunted by condensers 53 and 54, respectively, to filter the ripple current around potentiometer 50. Variable tap 55 of potentiometer 50 is connected to grid 58 of an amplifier tube 56, which serves as an inverter and which has its plate 62 connected to the voltage source 22 through a resistance 57. The cathode 59 of the tube 56 is connected through a variable resistance 60 to ground at 67 and is also connected through a resistance 61 to the voltage source 22.

The plate 62 of tube 56 is connected to a control anode 63 of the cold cathode tube 20 and when the plate 62 becomes sufficiently positive, it will supply an increased positive voltage to the control anode 63 to make control anode 63 sufficiently positive with respect to cathode 64 to cause the tube 20 to conduct energizing current to a relay 65. When relay 65 is energized it will close its contacts 66 to supply current from source 2 to light lamp 13.

From the foregoing it is believed to be apparent that an increase in flow of current across the tube 56 due to an increase in the voltage applied to grid 58 will result in the control anode 63 becoming less positive and will prevent the firing of tube 20. However, when the voltage applied to grid 58 decreases, due indirectly to a decrease beyond the acceptable range of the voltage drop across voltage divider 36, which in turn indicates less than the desired impedance of the coil 9, the current flow across tube 56 will drop and the voltage at the control anode 63 will be sufficient to fire the tube.

In the operation of the apparatus a coil 9 to be tested may be connected across the secondary 8 of transformer 7, the switch 10 closed and thereafter voltage source 22 may be connected to the plates 18 and 19 of tubes 20 and 21 by closing switch 15. The connection of the coil 9 across the transformer 7 will result in the application to the coil of a relatively high voltage, for example, 1400 volts A. C. at a relatively high frequency, for example, 7000 cycles. Since the voltage dividers 30 and 36 are connected across the secondary 8 of the transformer 7 in parallel with the coil 9 there will be a voltage drop across the two voltage dividers.

Since the impedance of the relay coil 9 determines the amount of current drawn from the amplifier 5 and since the amplifier 5 is so selected that any variation of the coil impedance will vary the amplifier output, a change in the coil impedance will result in a variation in the voltage drop across the voltage dividers 30 and 36. It has been found that if the coil impedance is such that it does not vary the output of transformer 7 by more or less than 200 volts, the coils are acceptable, and accordingly the adjustable arms of the voltage divider 30 and of the potentiometer 50 are so set that when the voltage at the output of transformer 7 reaches either 1200 volts or 1600 volts either tube 20 or 21 will be fired.

When the switches 10 and 15 are closed a coil 9 having the proper impedance will not cause either tube 20 or tube 21 to fire and then neither the lamp 13 nor the lamp 14 will be lighted, indicating that the coil has the proper impedance. If the impedance of the coil is higher than the selected range, the voltage drop across the voltage divider 36 will be ineffectual to fire the tube 20, but the increase in the voltage drop across the voltage divider 30 will make the control anode 31 more positive and will result in the ionization of tube 21, thus to energize relay 33.

In the event that the coil under test has an impedance less than the selected range, the voltage drop across the voltage divider 36 will decrease, causing a decrease in voltage bias at grid 58 of tube 56. When the voltage bias of tube 56 drops, the voltage at plate 62 will rise and thus render the control anode of tube 20 sufficiently positive to cause this tube to fire, thereby supplying current to relay 65 which will close its contacts 66 and supply current to the lamp 13.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing the impedance of articles, comprising means variable in response to load for applying a selected voltage of alternating current at a selected frequency to opposite ends of the article, a pair of cold cathode tubes, relays connected in the cathode circuits of said tubes, signal lamps operable under control of said relays, means for supplying voltage to the anodes of said cold cathode tubes, a voltage divider connected in parallel with the article under test and having a center tap connected to the control anode of one of said cold cathode tubes thereby to cause said one cold cathode tube to conduct when the voltage drop across said voltage divider exceeds a predetermined amount, a second voltage divider also connected in parallel with the article under test, and an inverter operable when the voltage drop across said second voltage divider falls below a predetermined amount to supply a control voltage to the control anode of the other cold cathode tube, the voltage drops across said dividers being at all times proportional to the impedance of the article under test.

2. An apparatus for testing the impedance of articles, comprising a source of test voltage variable in response to load, means for connecting an article to be tested across the source of test voltage, a pair of voltage dividers connected in parallel with the article under test, a pair of electronic tubes having control elements, signal means connected to be operated by the electronic tubes upon the application of a predetermined voltage to the control elements thereof, means connecting the control element of one of said electronic tubes to a tap of one of the voltage dividers thereby to cause said one electronic tube to operate one of said signal means when the voltage drop across the divider exceeds a predetermined amount, means connected to a tap of the other voltage divider for rectifying the output thereof, an electronic amplifier having a grid and a plate, said grid being connected to the output of the rectifier to control the current flow across the amplifier, and means of connection from the plate circuit of the amplifier to the control element of the other electronic tube, thereby to cause said other electronic tube to operate the other of said signal means when the voltage drop across said other voltage divider falls below a predetermined value, the voltage drop across said dividers being at all times proportional to the impedance of the article under test.

3. An apparatus for testing the impedance of articles, comprising means variable in response to load for applying a selected voltage of alternating current at a selected frequency to opposite ends of the article, a pair of cold cathode tubes, relays connected in the cathode circuits of said tubes, signal lamps operable under control of said relays, means for supplying voltage to the anodes of said cold cathode tubes, a voltage divider connected in parallel with the article under test and having a tap connected to the control anode of one of said cold cathode tubes, thereby to cause said one cold cathode tube to operate one of said relays when the voltage drop across the divider exceeds a predetermined amount, a second voltage divider also connected in parallel with the article under test, a rectifier connected to a tap of the second voltage divider for supplying a source of rectified current, and an inverter operable under control of said source of rectified current and connected to supply biasing voltage to the control anode of the other cold cathode tube, thereby to cause said other cold cathode tube to operate the other of said relays when the voltage drop across the second divider falls below a predetermined amount, the voltage drop across said dividers being at all times proportional to the impedance of the article under test.

4. An apparatus for testing the impedance of articles, comprising a source of test voltage having poor voltage regulation, means for connecting an article to be tested across the source of test voltage, a pair of voltage dividers connected in parallel with the article to be tested, an electronic tube and a signal device responsive to a predetermined voltage drop across one of said voltage dividers, a second electronic tube and a second signal device responsive to a voltage drop less than said predetermined voltage drop across the other voltage divider, means of connection between said second electronic tube and second voltage divider, including an inverter and a rectifier connected to supply an increase in voltage to a control element of said second electronic tube upon a decrease in current through the inverter, said voltage drops being proportional to the impedance of said article.

5. An apparatus for testing the impedance of articles, comprising signal devices for selectively indicating that an article under test has an impedance above or below a selected range of impedance, electronic tubes individual to each of said signal devices and operable to energize said signal devices upon the selective firing of said electronic tubes, means variable in response to load for supplying a test voltage across an article to be tested, a pair of voltage dividers connected in parallel with the article to be tested, means of connection between one of said voltage dividers and one of said electronic tubes for controlling the firing of the tube upon a rise above a predetermined value of the voltage drop across said dividers, a rectifier connected to receive voltage from the other voltage divider, an amplifier tube operable under control of said rectifier and having a plate circuit and means of connection between the plate circuit of said amplifier and a control element of the second electronic tube to fire the second electronic tube upon a decrease in voltage drop across said dividers below a predetermined value.

6. An apparatus for testing breakdown of inductances, which comprises, a poorly regulated source of high voltage, high-frequency, alternating current having one side grounded, means for connecting an inductance across said source of current, a voltage divider connected in parallel with an inductance so connected, a source of direct current having its negative side grounded, and a cold cathode tube connected across said source of direct current having a control anode connected to the tap of voltage divider.

7. An apparatus for testing insulation breakdown of coils, which comprises, a source of high voltage, high-frequency alternating current having poor characteristics of regulation, means for connecting a coil to be tested across said current source, a voltage divider connected across said current source in parallel with a coil being tested, a rectifier circuit connected to the voltage dividing means, a cold cathode tube, and an inverter responsive to voltage drop of the rectifier output for triggering the cold cathode tube.

HAROLD F. BLAIR.

REFERENCES CITED

The following references are of record in the file of this patent:

UNITED STATES PATENTS

| Number | Name | Date |
| --- | --- | --- |
| 1,743,386 | Paulson | Jan. 14, 1930 |
| 1,931,054 | Butterfield | Oct. 17, 1933 |
| 1,951,461 | Wilson | Mar. 20, 1934 |
| 2,369,070 | Nielsen | Feb. 6, 1945 |
| 2,449,739 | Duttera | Sept. 21, 1948 |
| 2,474,692 | Rossoff | June 28, 1949 |
| 2,479,051 | Sunstein | Aug. 16, 1949 |
| 2,515,736 | Saville et al. | July 18, 1950 |